United States Patent
Boesch

[19]

[11] Patent Number: 6,125,185
[45] Date of Patent: Sep. 26, 2000

[54] SYSTEM AND METHOD FOR ENCRYPTION KEY GENERATION

[75] Inventor: Brian P. Boesch, Oak Hill, Va.

[73] Assignee: CyberCash, Inc., Reston, Va.

[21] Appl. No.: 08/863,732

[22] Filed: May 27, 1997

[51] Int. Cl.[7] .................................................. H04L 9/00
[52] U.S. Cl. ............................ 380/285; 705/71; 713/170
[58] Field of Search ............................... 380/21, 30, 285; 705/71, 68; 713/170

[56] References Cited

U.S. PATENT DOCUMENTS

| | | | |
|---|---|---|---|
| 4,281,215 | 7/1981 | Atalla . | |
| 4,503,287 | 3/1985 | Morris et al. . | |
| 4,731,840 | 3/1988 | Mniszewski et al. | 380/21 |
| 4,912,762 | 3/1990 | Lee et al. | 380/24 |
| 5,073,934 | 12/1991 | Matyas et al. | 380/30 |
| 5,144,665 | 9/1992 | Takaragi et al. | 380/30 |
| 5,144,667 | 9/1992 | Pogue, Jr. et al. | 380/45 |
| 5,237,611 | 8/1993 | Rasmussen et al. | 380/21 |
| 5,241,591 | 8/1993 | Saji | 379/361 |
| 5,253,294 | 10/1993 | Maurer | 380/21 |
| 5,406,628 | 4/1995 | Beller et al. | 380/30 |
| 5,454,039 | 9/1995 | Coppersmith et al. | 380/28 |
| 5,457,748 | 10/1995 | Bergum et al. | 380/50 |

*Primary Examiner*—Salvatore Cangialosi
*Attorney, Agent, or Firm*—Roberts Abokhair & Mardula LLC

[57] ABSTRACT

A method to balance or level processor computational load during the generation of random symmetric DES type keys and RSA type public key encryption, whereby the DES type keys are pre-generated and pre-encrypted for known and expected receivers, and stored for immediate access during time-critical on-line communication between the sender and receiver. A method for authentication using the sender's RSA public key is also disclosed whereby the sender's authenticating signature is pre-generated and stored with the pre-generated and pre-encrypted DES keys.

9 Claims, 4 Drawing Sheets

SYSTEM AND METHOD FOR ENCRYPTION KEY GENERATION

FIELD OF THE INVENTION

The present invention relates generally to the field of secure information transmission, and more particularly to encryption of information with DES type keys in conjunction with public/private RSA type keys as implemented in the electronic commerce environment.

BACKGROUND OF THE INVENTION

In the expanding field of data communication where privacy and security of information is critical, a number of different techniques are used to provide for near transparent information exchange without undue risk of compromise. Predominant among those are various cryptographic techniques. One technique is use of a session key, applicable to a single information exchange session. Another technique is use of a public/private key combination which is applicable to multiple information exchange sessions. Each technique has unique advantages and disadvantages and both are well known to those skilled in the field.

Message encryption using a session key relies on the encryption key remaining known to only the parties participating in the individual session. For this reason, the session key must be distributed in a secure manner to each of the parties prior to the session, and the session key must be destroyed or protected following the session. If the session key is compromised, an eavesdropper will be able to reconstruct the information exchange. An example of an encipherment function using a session key is the National Bureau of Standards Data Encryption Standard (DES). In an example, a plain text message M is enciphered or encrypted to produce a cypher message c using the encipherment function f by the formula c=f(m, sk) where sk is the session key. The receiver is able to recover the plain text message m through knowledge of the session key sk using the inverse of the encipherment function m=$f^1$(c, sk).

Single session keys provide a very secure method of encryption. However, single session keys are difficult to distribute and maintain securely when multiple different parties require the ability to communicate securely with each other.

An alternative method for maintaining secure information exchange between multiple different parties is to use public key cryptographic techniques. Typically, each party i has a public key Pi and a private or secret key Si. The public key Pi is known to everyone, but the private or secret key Si is known only to party i. A party j, who wishes to send a message m to party i, uses the public key Pi to create a cipher message c=p(m, Pi), where c is the encrypted message, m is the plain text message, Pi is the public key, and p represents the public key operation. However, in contrast to the session key technique, the cipher message can only be decrypted by party i using her own secret private key Si (e.g., m=s(c, Si), where s signifies the private key operation).

The public/private key encryption technique is well known in the field, and is often paired with the session key technique to distribute session keys in a secure manner.

When using the public/private key encryption technique to protect information over an unsecure medium, there is substantial computational cost for both the sender and receiver. This computational cost and time becomes very critical when the size of the data block to be transmitted is small. Information exchanges with small data blocks include the types of information exchange that is routine in most financial transactions, where the information block may only encompass 2KB. As an example, when public key cryptography is used to encrypt and distribute the symmetric single session key with small data blocks, even a fast Pentium® class computer will require about 1/10 second to encrypt a DES key using 768 bit RSA, while encrypting the 2KB block of data using DES will be only a few milliseconds. On a slower processor, the RSA time may be up to ½ second. When a large volume of small value financial transactions are accomplished over a short period of time, it therefore becomes important to find techniques to reduce the RSA time to optimize processor efficiency when exchanging small data blocks.

A number of patents exist dealing with improved methods for encryption of messages. U.S. Pat. No. 5,457,748 to Bergum et al., was issued for a "Method and Apparatus for Improved Security within Encryption Communication Devices." This invention is drawn to maintaining security of keys that are used for encryption, which keys are stored in the volatile memory of a computer. This invention addresses the issue of providing greater security for storage and utilization of encryption and decryption keys. The invention stores encrypted representations of keys in non-volatile memory. Keys are later reconstructed and stored in RAM for subsequent use. This avoids the problem of ineffective erasure of keys stored in non-volatile memory and hence potential security breech from recovery of keys from such non-volatile memory. The relevance of this patent is the fact that the keys are pre-stored in the encrypted form This strictly is an enhanced security scheme and the invention does not disclose the computational load associated with public/private key in an electronic commerce environment.

U.S. Pat. No. 5,454,039 to Coppersmith et al., was issued for a "Software Efficient Pseudo Random Function and the Use Thereof for Encryption." This invention relates to methods for using encryption and for high speed computationally efficient encryption on conventional computers. The relevance of this patent is the fact that to accomplish the encryption rapidly, a pseudo random numbered table is pre-computed and then used to create the keys to encrypt. The invention does not disclose an encryption of specific keys and does not address the public/private key encryption scheme.

U.S. Pat. No. 5,406,628 to Beller et al., was issued for "Public Key Authentication and Key Agreement for Low Cost Terminals." The relevance of this patent is the fact that pre-computation of key related elements is disclosed with the pre-computation done in association with a particular form of signature operation. However, this invention does not disclose a large scale pre-computation of keys that are subsequently stored for later use.

U.S. Pat. No. 5,253,294 to Maurer was issued for a "Secured Transmission System." The relevance of this patent is the disclosure of the encryption of the key used for subsequent transmission. Further, the specification notes that one embodiment may be that many whole keys may be stored in one location such as "read only" memory. Keys are then extracted and used in order so that all stations have the same keys at the same time. The patent also discloses that certain "key material" may be pre-stored in a library of key material and used as needed. However, this invention does not disclose public/private key encryption or transmission of messages according to public/private key and the computational penalties associated therewith.

U.S. Pat. No. 5,144,667 was issued to Pogue, Jr. et aL, for a "Method of Secure Remote Access." This patent relates to access devices for vehicles and uses specifically an RSA public key system. This invention notes the storing of a common key and an encrypted form of a common key. However, the '667 patent does not address issues associated with peak processing times and is not designed to be used in the communication system but is used to enhance security of a static security system associated with individual vehicles to which access is desired. Thus, large scale pre-processing is not disclosed.

U.S. Pat. No. 5,237,611 was issued to Rasmussen et al., for a "Encryption/Decryption Apparatus with Non-Accessible Table of Keys." This invention discloses tables of key encryption keys which are stored in encrypted form and RAM. These keys include both "public" and "private" sets of KEKs which are computed in advance and stored in the device of the '611 patent. However, this invention does not disclose use in an environment of highly active electronic commerce.

U.S. Pat. No. 5,144,665 was issued to Takarati et al., for a "Cryptographic Communication Method and System." This invention is a cryptographic communication system operating between a host computer and a plurality of terminals connected to the host. Storage of key information is disclosed in the specification, however, such storage does not involve the pre-processing of cryptographic keys. Additionally, this invention delays public key cryptographic processing until the very last moment, and does not provide for pre-processing of keys and storage until such time as the keys are to be used.

U.S. Pat. No. 5,073,924 to Matyas et al., was issued for a "Method and Apparatus for Controlling Use of a Public Key Based on the Level of Import Integrity for the Key." The relevance of this patent is the disclosure of a cryptographic key data set (CKDS) which is a storage of cryptographic key information that is later accessed from a database. This CKDS comprises encrypted keys although calculation of the CKDS is not disclosed. The public keys and private keys used are calculated using key generation algorithm. The encrypted form of the public key is then stored in the CKDS after receiving location data processing. This invention does not disclose the pre-processing of encrypted key storage.

None of the prior art provides a method for resource leveling of the computational resources by generating symmetric key, encrypting the symmetric key with DES, and storing both for immediate and ready access prior to their demand.

DETAILED DESCRIPTION OF THE PREFERRED EMBODIMENT

Figure 1:
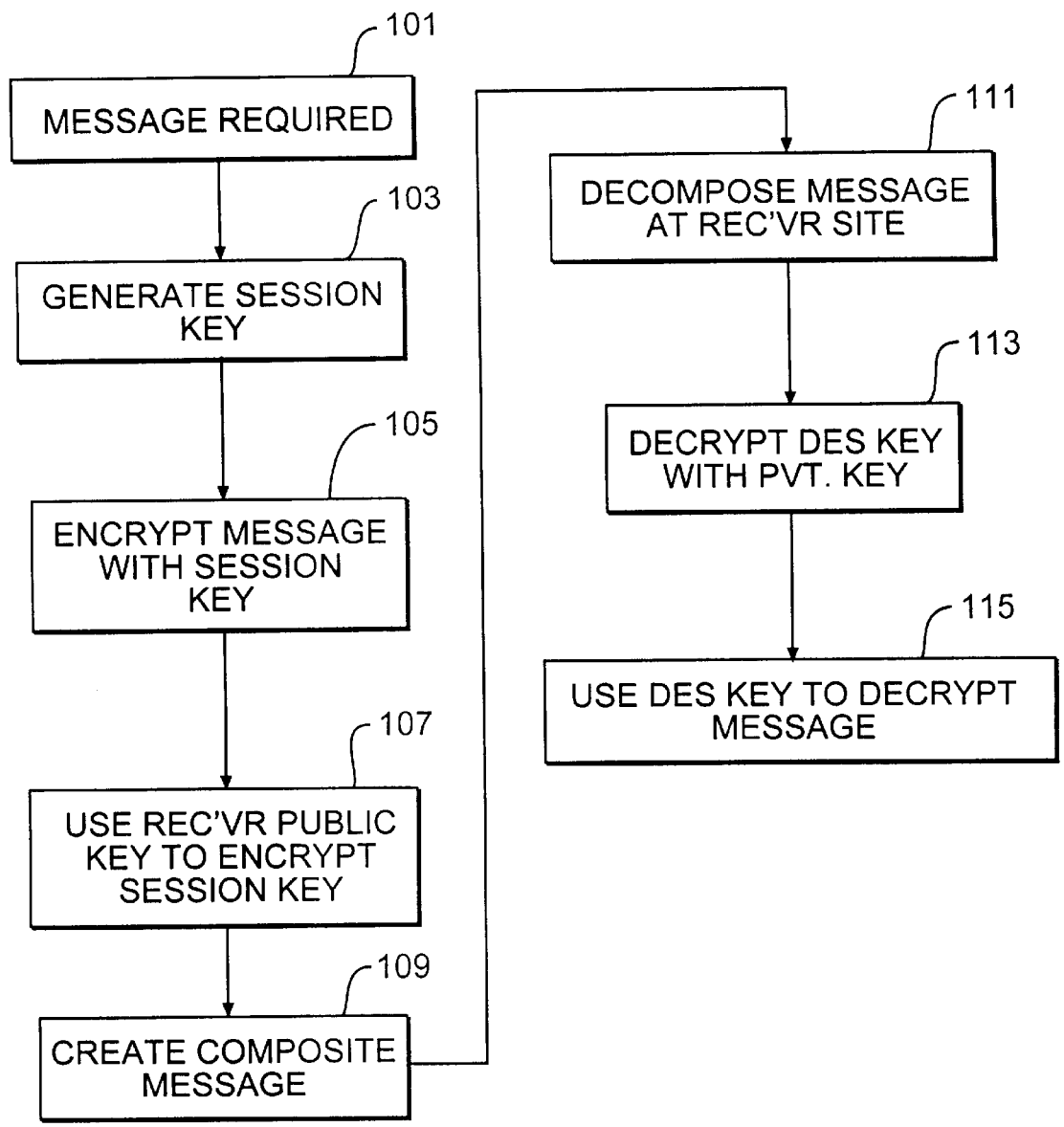
FIG. 1 illustrates a method known in the art for encrypting messages using combined DES and RSA key encryption.

Referring to FIG. 1, the traditional method of mixed DES and public/private key encryption is illustrated. The sending party determines the need to create and send message "M" 101 to the receiving party. The sending party randomly generates a single session symmetric DES key k 103. At this point, the sending party encrypts the message M with the DES key k 105. However, at this point, the receiving party does not know the single session key k and would be unable to recover the message M. To securely transmit the single session key k to the receiving party, the sending party uses public/private key encryption like RSA. If the receiver's public key Pr is not already known, the sending party and receiving party establish communication and the receiver provides public key Pr to the sender. The sending party then uses the receiver's public key Pr to encrypt the DES key k 107. To complete the exchange, the sending party creates a composite message 109 consisting of the encrypted DES key and the encrypted message, and sends this composite message to the receiving party.

The receiving party has retained their secret or private key Sr with which to decrypt message that were encrypted with their public key Pr. When the composite message is received, the receiving party decomposes the message into two parts, the encrypted DES key k and the encrypted message M 111. Using their secret or private key Sr, the receiving party is then able to decrypt the DES key K 113, and then use the DES key K to decrypt the message M 115. In this manner, the sender has been able to send a secure message using a single session encryption key to the receiver knowing only the receiver's public key Pr. The receiver has been able to receive a message encrypted with a single session DES key k, but was not required to receive and store the single session DES key k for an extended period of time prior to receipt of the message M.

For large messages, this is a reasonably efficient means of information exchange. The time required to generate the DES key k, and encrypt it with the receiver's public key Pr is generally small when compared to the time for encryption of the message itself and the transmission time between sender and receiver. However, for large volumes of small messages, particularly those with data blocks of 2KB or less, this is not an efficient means of information exchange. Financial transactions, especially as they occur with electronic commerce, will frequently generate a large volume of transactions which must be handled without delay in a secure automated manner. With a Pentium® class processor installed in the sending computer, the time required to generate the DES key k, and encrypt that DES key with the receiving parties public key Pr may be $\frac{1}{10}$ second, while the time to encrypt a 2KB message will be milliseconds. Many sending parties will have less powerful processors which could require ½ second for the DES key generation and encryption of the DES key.

The computational requirements and loading for the sending party computers is subject to peaks and valleys, with the processor fully used for certain operations, and marginally used for other operations. When a sending system must achieve and maintain a certain level of performance the processor is generally selected to match the peak performance requirements. This results in greater expense to handle the peak loads, but underutilization of the processor for the remainder of the cycle. If the processor resource load can be leveled, the system can perform more efficiently, and the processor need not be as powerful to achieve the same overall level of performance.

The present invention provides a method for leveling processor loading by shifting the most computationally complex operations out of the real-time cycle and allowing the processor to generate those computationally complex factors during periods of less than peak loading.

Figure 2:
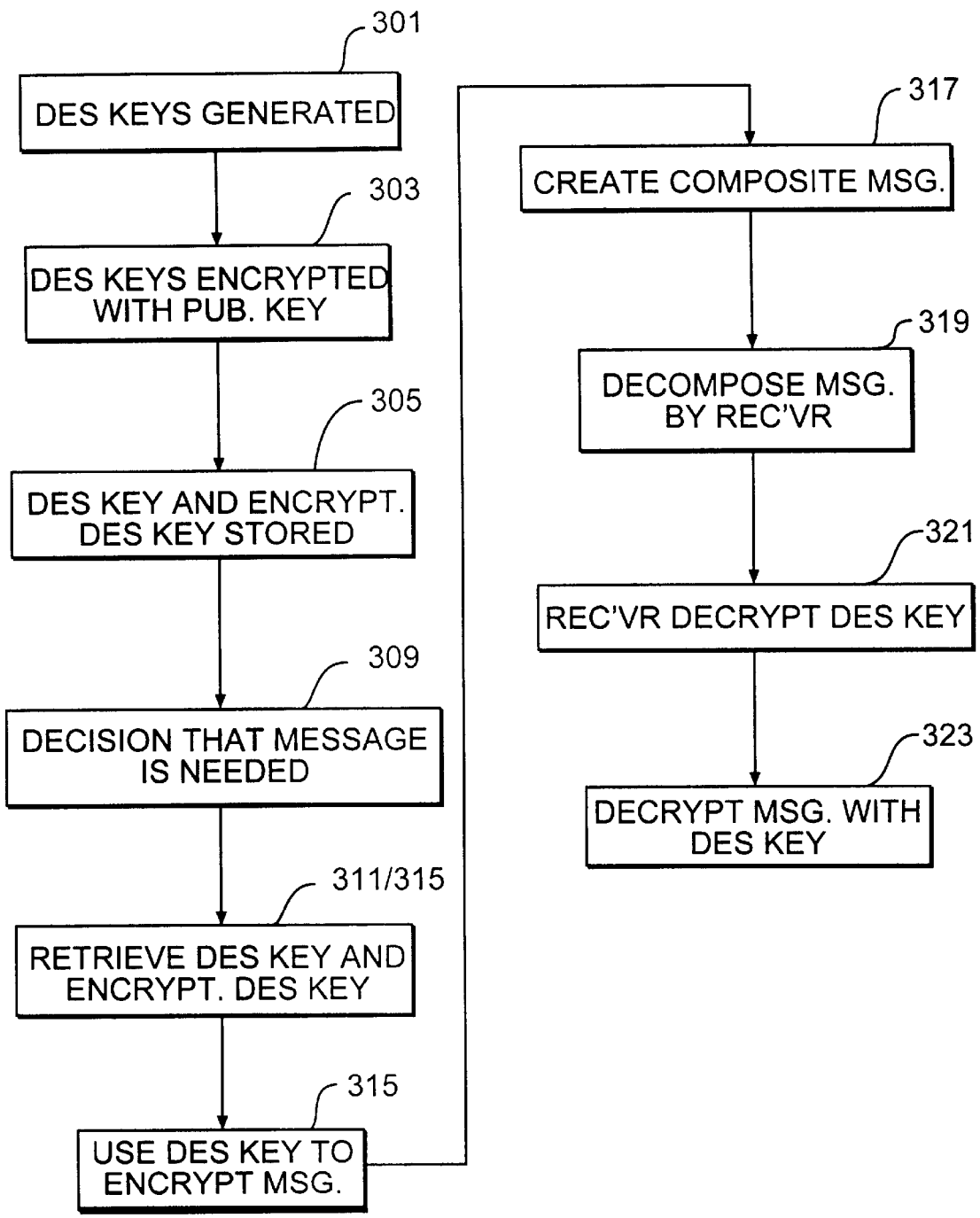
FIG. 2 illustrates a preferred embodiment of the present invention, whereby the DES key is generated, encrypted and stored for later use.

Referring to FIG. 2, this method for processor leveling is illustrated. During periods of less than peak loading, the sending processor of the present invention generates a series of DES keys k 301, and encrypts those DES keys with the public key Pr 303 of expected receiving parties. For most financial transactions there will be limited number of receiving parties, so knowledge of their individual public keys will be available and maintained by the sending party processor. Once the DES key k and encrypted DES key Pr(k) is generated at the sending party, they are stored 305 for ready use by the processor in something like a first in first out (FIFO) queue stack 307.

Considering now the on-line or real-time cycle, when the sending party needs to create and transmit a message M 309, the processor retrieves the DES key k 311, and the encrypted DES key Pr(k) 313 and uses the DES key k to encrypt the message M 315. Then, in the same fashion as currently used in the field, the sending party creates a composite message 317 consisting of the encrypted DES key and the encrypted message, and sends this composite message to the receiving party.

The receiving party has retained their secret or private key Sr with which to decrypt messages that were encrypted with their public key Pr. When the composite message is received, the receiving party decomposes the message into two parts, the encrypted DES key k and the encrypted message M 319. Using their secret or private key Sr, the receiving party is then able to decrypt the DES key K 321, and then use the decrypted DES key K to decrypt the message M 323. In this manner, the sender has been able to send a secure message using a single session encryption key to the receiver knowing only the receiver's public key Pr. The receiver has been able to receive a message encrypted with a single session DES key k, but was not required to receive and store the single session DES key k for an extended period of time prior to receipt of the message M. Additionally, the sending party was able to level the peak processor computational requirements by shifting the most complex operations out of the most demanding real-time cycle and into the off-peak cycle.

Figure 3:
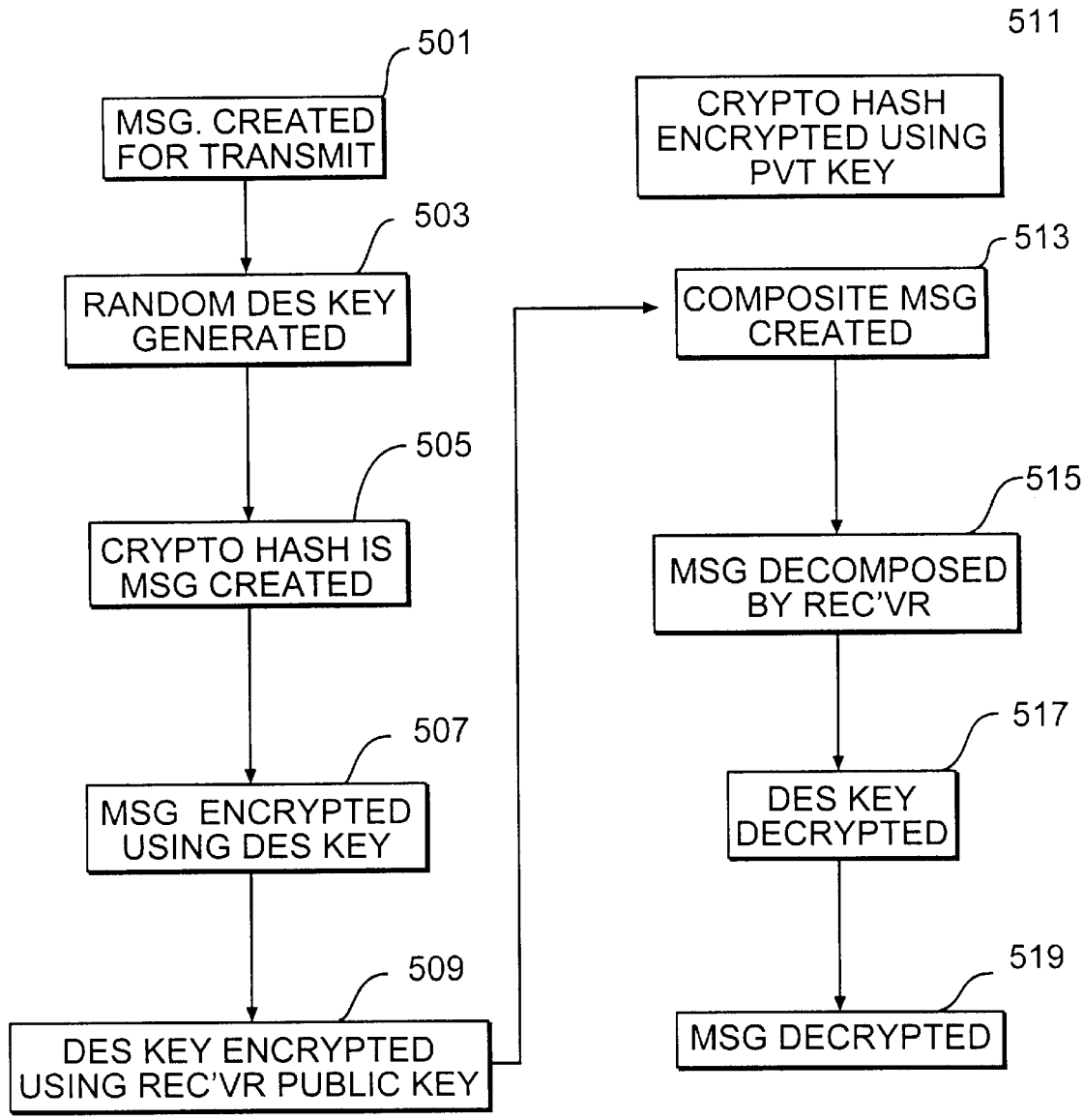
FIG. 3 illustrates a method known in the art for authenticating encrypted messages using combined DES and RSA key encryption.

It is frequently desired to provide some form of authentication as to the identity of the sender of a message, otherwise an imposter can impersonate a sender. Referring to FIG. 3, a method known in the field is illustrated. The sender creates a message for transmission 501, and generates a random single session DES key 503. A cryptographic hash of the message is created 505, and the message is encrypted using the DES key 507. The DES key is then encrypted with the receiver's RSA public key 509. To provide a form of authentication, the sender encrypts the cryptographic hash 511 using the sender's RSA private or secret key Ss. Finally, the sender creates a composite message consisting of the encrypted message, the encrypted DES key and the signed hash and sends the composite message to the receiver 513. The receiver decomposes the received message into the individual parts 515, and decrypts the DES key using the receiver's RSA secret or private key Sr 517. Using the decrypted DES key, the receiver decrypts the message 519, and finally decrypts the signed hash using the sender's RSA public key Ps, to verify the sender's identity.

Figure 4:
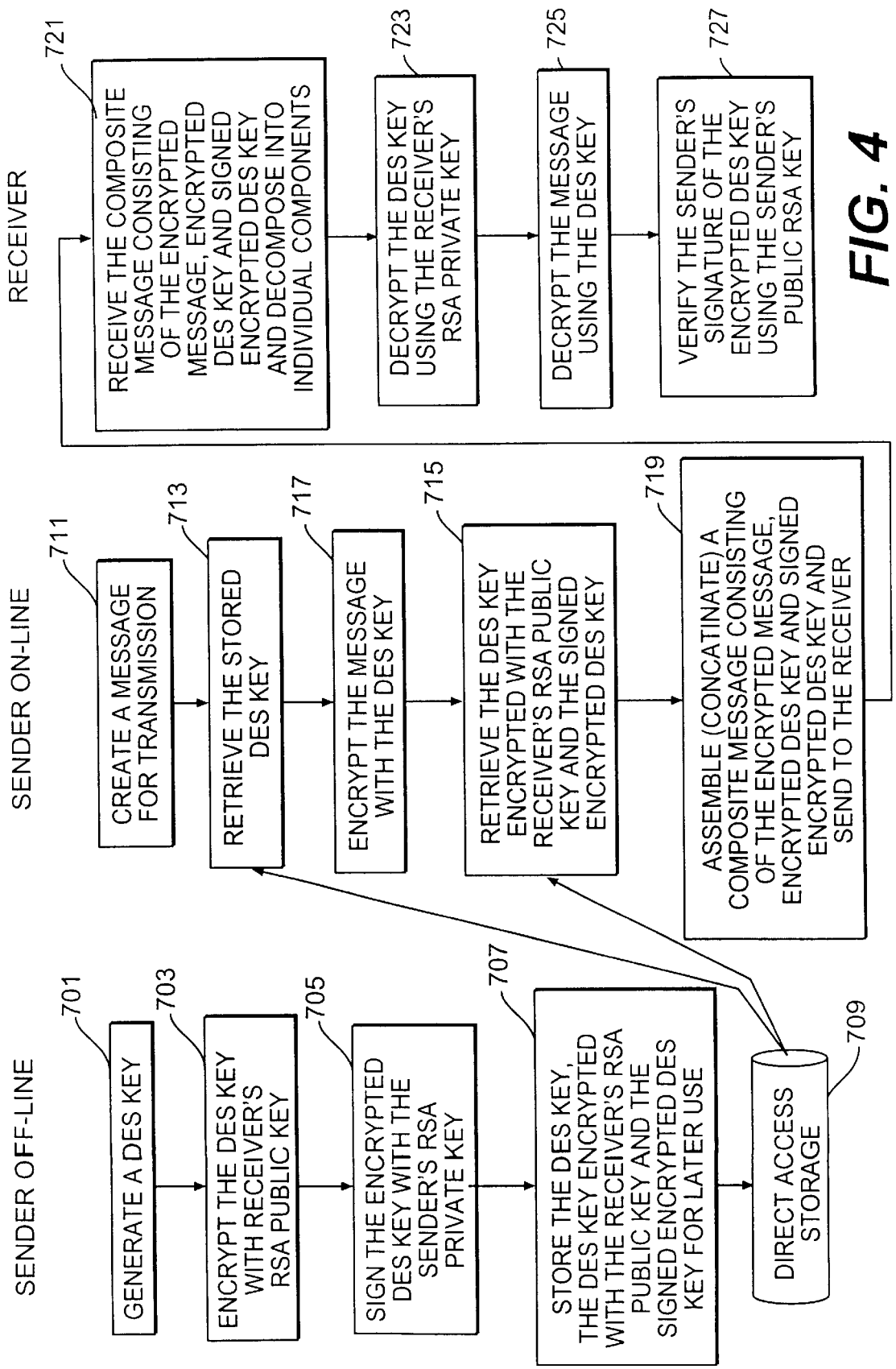
FIG. 4 illustrates a preferred embodiment of the present invention, whereby an authentication signature is generated in conjunction with the DES key and both are stored with the encrypted DES key for later use.

Referring to FIG. 4, the authentication method of the present invention is illustrated. During periods of less than peak loading, the sending processor of the present invention generates a series of DES keys k 701, and encrypts those DES keys with the public key Pr 703 of expected receiving parties. For most financial transactions there will be limited number of receiving parties, so knowledge of their individual public keys will be available and maintained by the sending party processor. To provide authentication, the sending processor then signs the encrypted DES key with the sender's RSA private or secret key Ss 705. Once the DES key, encrypted DES key, and signed encrypted DES key is generated by the sending party, they are stored 707 for ready use by the processor in something like a first in first out (FIFO) queue stack 709.

In the event that stronger authentication is required, an additional key could be included with the DES key and encrypted and signed at the same time as the DES key. This additional key would then be used in conjunction with a symmetrical algorithm to produce a message authentication code (MAC) or message integrity code (MIC). It is preferred that the additional key be pre-and post-appended to the text to be authenticated and a cryptographic hash algorithm be used to generate the MAC or MIC.

Considering now the on-line or real-time cycle, when the sending party needs to create and transmit a message M 711, the processor retrieves the DES key k 713, the encrypted DES key Pr(k), and the signed encrypted DES key, 715 and uses the DES key k to encrypt the message M 717. Finally, the sending party creates a composite message 719 consisting of the encrypted message, encrypted DES key and signed encrypted DES key and sends this composite message to the receiving party.

The receiving party has retained their secret or private key Sr with which to decrypt messages that were encrypted with their public key Pr. When the composite message is received, the receiving party decomposes the message into three parts, the encrypted DES key k, the signed encrypted DES key, and the encrypted message M 721. Using their secret or private key Sr, the receiving party is then able to decrypt the DES key K 723, and then use the decrypted DES key K to decrypt the message M 725. Finally, the receiver uses the sender's RSA public key Ps to authenticate the sender's signature 727. In this manner, the sender has been able to send and authenticate a secure message using a single session encryption key to the receiver knowing only the receiver's public key Pr. The receiver has been able to receive a message encrypted with a single session DES key k, knowing only the sender's public key Ps, but was not required to receive and store the single session DES key k for an extended period of time prior to receipt of the message M. Additionally, the sending party was able to level the peak processor computational requirements by shifting the most complex operations out of the most demanding real-time cycle and into the off-peak cycle.

This disclosure and specification has illustrated a specific embodiment of the invention, but it will be understood by those having skill in the art that changes or modifications can be made to the invention without departing from the spirit and the scope of the invention.

What is claimed is:

1. A method of leveling processor computational load during secure information exchange, comprising:

(a) generating session encryption keys during periods of low processor computational load and storing said session encryption keys during periods of low processor computational load;

(b) encrypting a selected, stored session encryption key with a public encryption key of an expected party to a secure information exchange during periods of low processor computational load and storing said encrypted session encryption keys during periods of low processor computational load;

(c) creating a message for delivery to said expected party;

(d) retrieving said selected, stored session encryption key and stored encrypted session encryption key of said expected party;

(e) encrypting said message to form an encrypted message;

(f) creating a composite message composed of said encrypted message and said encrypted session encryption key of said expected party; and (g) sending said composite message to said expected party.

2. The method of leveling processor computational load during secure information exchange of claim 1, wherein said session encryption key is a DES key and said public encryption key is an RSA public key.

3. The method of leveling processor computational load during secure information exchange of claim 1, wherein said message is has data blocks of 2 KB (Kilobytes) or less.

4. The method of leveling processor computational load during secure information exchange of claim 3, wherein said message involves electronic commerce.

5. The method of leveling processor computational load during secure information exchange of claim 1, wherein said expected party requires only their own private encryption key to participate in the secure information exchange and uses their private encryption key to decrypt the session key and uses session to decrypt the message.

6. The method of leveling processor computational load during secure information exchange of claim 1, further comprising:

(h) signing each encrypted session key in association with step (a);

(i) storing said signed encrypted session keys in association with step (a); and (j) including a signed encrypted session key in said composite message.

7. The method of leveling processor computational load during secure information exchange of claim 6, wherein said expected party uses their private encryption key to decrypt the session key, uses the session key to decrypt the message, and uses the signed encryption key to authenticate the message.

8. The method of leveling processor computational load during secure information exchange of claim 6, wherein said signed encryption key is produced using the signer's private encryption key and authenticated by the expected party using the signer's public encryption key.

9. The method of leveling processor computational load during secure information exchange of claim 8, wherein the signer's private encryption key is an RSA private key and the signer's public encryption key is an RSA public key.

* * * * *

UNITED STATES PATENT AND TRADEMARK OFFICE
CERTIFICATE OF CORRECTION

PATENT NO. : 6,125,185
APPLICATION NO. : 08/863732
DATED : September 26, 2000
INVENTOR(S) : Boesch It is certified that error appears in the above-identified patent and that said Letters Patent is hereby corrected as shown below:

Fig. 4    Change "concatinate" to --concatenate--

| COL. | Line | |
|---|---|---|
| 7 | 19 | Change "message is has data blocks" to --message has data blocks-- |
| 7 | 28 | Change "uses session to decrypt" to --uses the session key to decrypt-- |

Signed and Sealed this

Twentieth Day of February, 2007

JON W. DUDAS
*Director of the United States Patent and Trademark Office*